United States Patent
Myers-Jones

(10) Patent No.: US 7,029,066 B1
(45) Date of Patent: Apr. 18, 2006

(54) SHOPPING CART SEAT CUSHION

(76) Inventor: Ann Myers-Jones, 4321 E. Anderson Dr., Phoenix, AZ (US) 85032

( * ) Notice: Subject to any disclaimer, the term of this patent is extended or adjusted under 35 U.S.C. 154(b) by 0 days.

(21) Appl. No.: 10/938,208

(22) Filed: Sep. 13, 2004

(51) Int. Cl.
A47C 31/00 (2006.01)

(52) U.S. Cl. ............................ 297/219.1; 297/219.12; 297/228.1; 297/229; 5/655

(58) Field of Classification Search ........... 297/256.17, 297/219.1, 219.11, 224, 225, 229, 228.11, 297/228.13, 219.12; 280/33.992, 33.993
See application file for complete search history.

(56) References Cited

U.S. PATENT DOCUMENTS

| | | | |
|---|---|---|---|
| 3,578,380 A | | 5/1971 | Jacobus |
| 4,324,430 A | * | 4/1982 | Dimas et al. .......... 297/256.17 |
| 4,655,502 A | * | 4/1987 | Houllis ........................ 297/229 |
| 4,666,207 A | * | 5/1987 | Quartano .................... 297/229 |
| D296,730 S | * | 7/1988 | Fetterman .................... D6/333 |
| 4,805,937 A | * | 2/1989 | Boucher et al. ....... 280/33.992 |
| 4,946,221 A | * | 8/1990 | Livingston ............. 297/184.13 |
| 5,238,293 A | | 8/1993 | Gibson |
| 5,275,463 A | * | 1/1994 | Rocha ......................... 297/229 |
| 5,330,250 A | | 7/1994 | Reyes |
| 5,678,888 A | | 10/1997 | Sowell et al. |
| 5,810,437 A | * | 9/1998 | Sharpe ................... 297/256.17 |
| 5,829,835 A | * | 11/1998 | Rogers et al. ......... 297/256.17 |
| 5,967,606 A | | 10/1999 | Bergh et al. |
| 6,129,418 A | * | 10/2000 | Bergh et al. ........... 297/256.17 |
| 6,164,726 A | * | 12/2000 | Reeves et al. ......... 297/452.63 |
| 6,491,996 B1 | * | 12/2002 | Digangi ....................... 428/43 |
| 6,851,749 B1 | * | 2/2005 | Norman ................. 297/256.17 |

* cited by examiner

*Primary Examiner*—Peter M. Cuomo
*Assistant Examiner*—Erika Garrett

(57) ABSTRACT

A shopping cart seat cushion includes a pillow that has a first side, a second side and a peripheral edge extending between the first and second sides. The pillow is filled with a resiliently compressible material. The first and second sides are each generally rounded. An upper edge, a lower edge and a pair of lateral edges of the pillow are defined. The pillow has a pair of openings extending therethrough. The openings are positioned nearer to the lower edge than the upper edge. The openings are horizontally aligned with each other. A fastening assembly is attached to the pillow for selectively coupling the second side of the pillow to a child seat of a shopping cart. A securing assembly is attached to the pillow for selectively coupling a child to the first side of the pillow.

5 Claims, 7 Drawing Sheets

1

SHOPPING CART SEAT CUSHION

BACKGROUND OF THE INVENTION

1. Field of the Invention

The present invention relates to cushion devices and more particularly pertains to a new cushion device for cushioning the seat of a shopping cart so that it is more comfortable for a child.

2. Description of the Prior Art

The use of cushion devices is known in the prior art. U.S. Pat. No. 5,967,606 describes a cushion for shopping cart that is simply positioned on the seating portion to provide a soft position for a child. Another type of cushion device is U.S. Pat. No. 5,238,293 which is designed to act as a quilted cover for a shopping cart seat. Another such device is shown U.S. Pat. No. 5,678,888 that is adapted for securing to a shopping cart seat so that the seat is substantially covered.

While these devices fulfill their respective, particular objectives and requirements, the need remains for a device that is retrofittable to a shopping cart with securing assemblies that prevent the device from shifting. The device should include a fastening assembly to secure a child in the seat. Additionally, the device should include toys and the like for entertaining the child.

SUMMARY OF THE INVENTION

The present invention meets the needs presented above by generally comprising a pillow that has a first side, a second side and a peripheral edge extending between the first and second sides. The pillow is filled with a resiliently compressible material. The first and second sides are each generally rounded. An upper edge, a lower edge and a pair of lateral edges of the pillow is defined. The pillow has a pair of openings extending therethrough. The openings are positioned nearer to the lower edge than the upper edge. The openings are horizontally aligned with each other. A fastening assembly is attached to the pillow for selectively coupling the second side of the pillow to a child seat of a shopping cart. A securing assembly is attached to the pillow for selectively coupling a child to the first side of the pillow.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
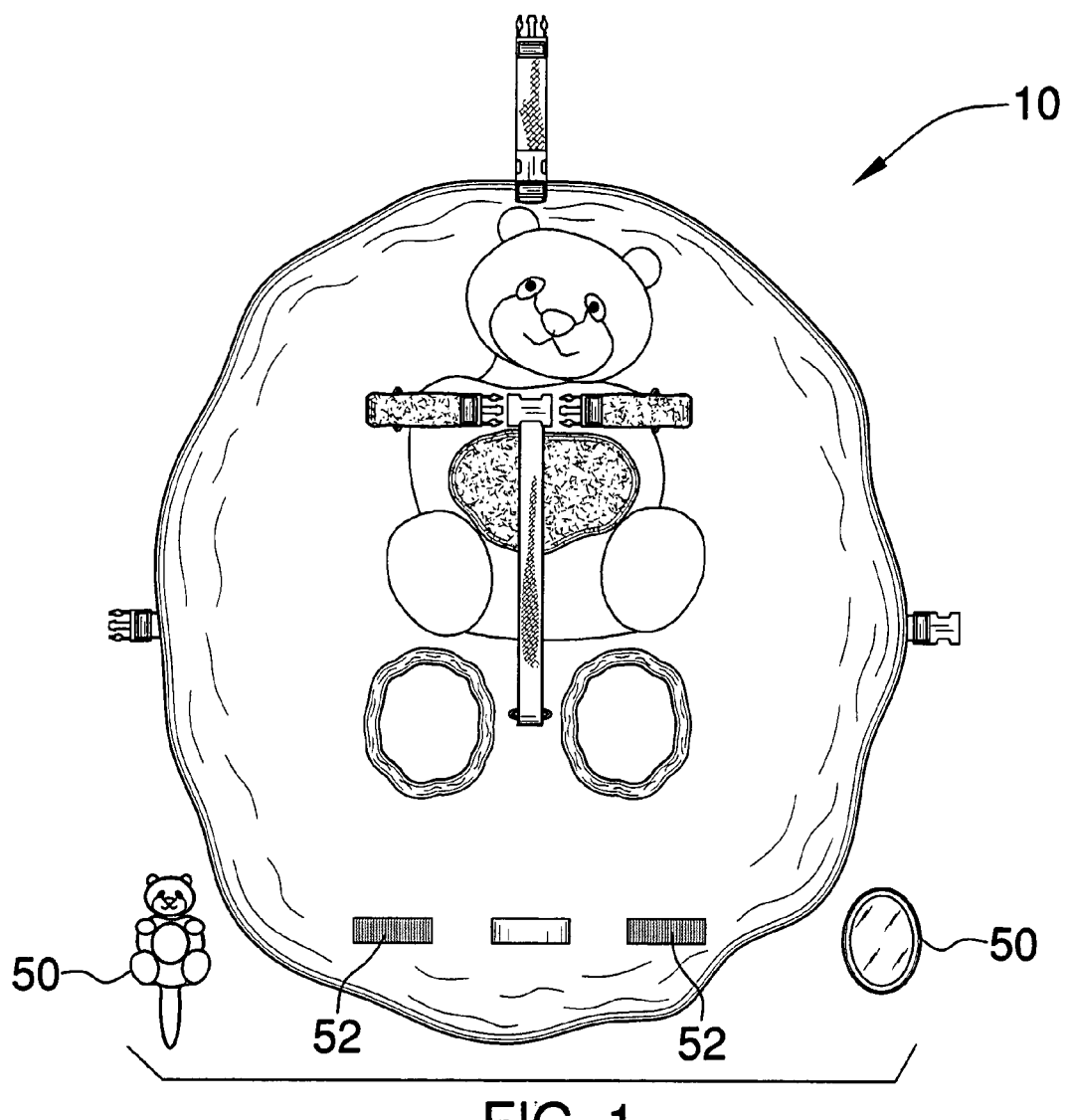
FIG. 1 is a front view of a shopping cart seat cushion according to the present invention.
Figure 2:
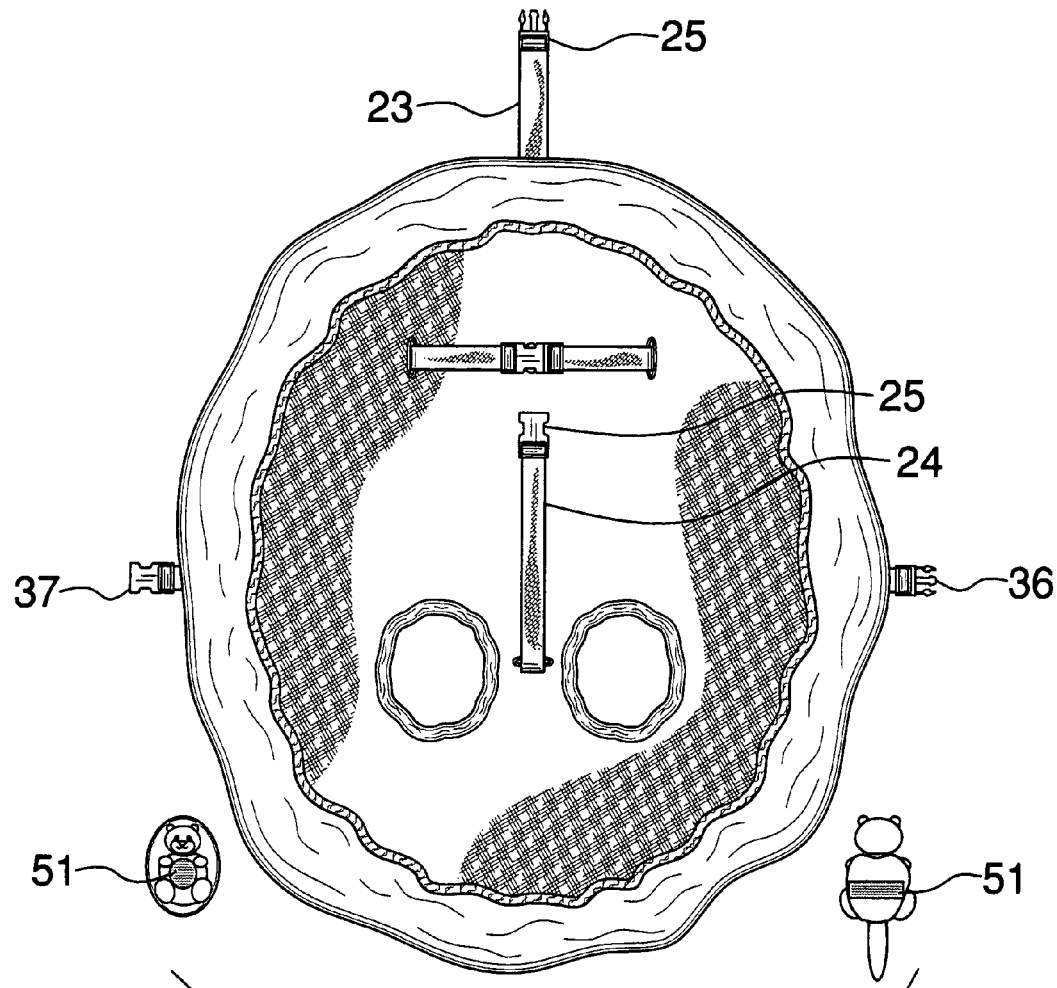
FIG. 2 is a rear view of the present invention.
Figure 3:
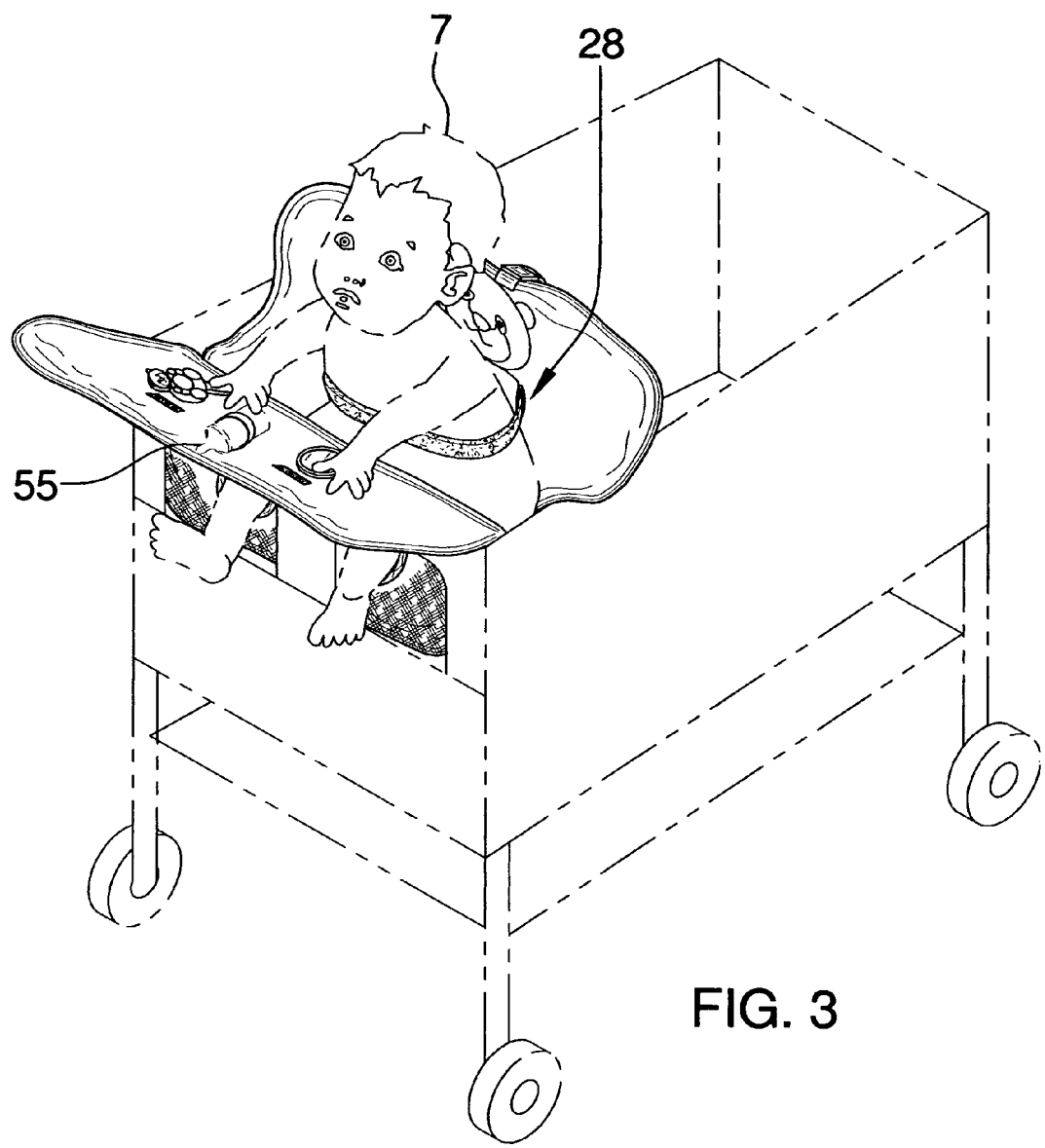
FIG. 3 is a perspective in-use view of the present invention.
Figure 4:
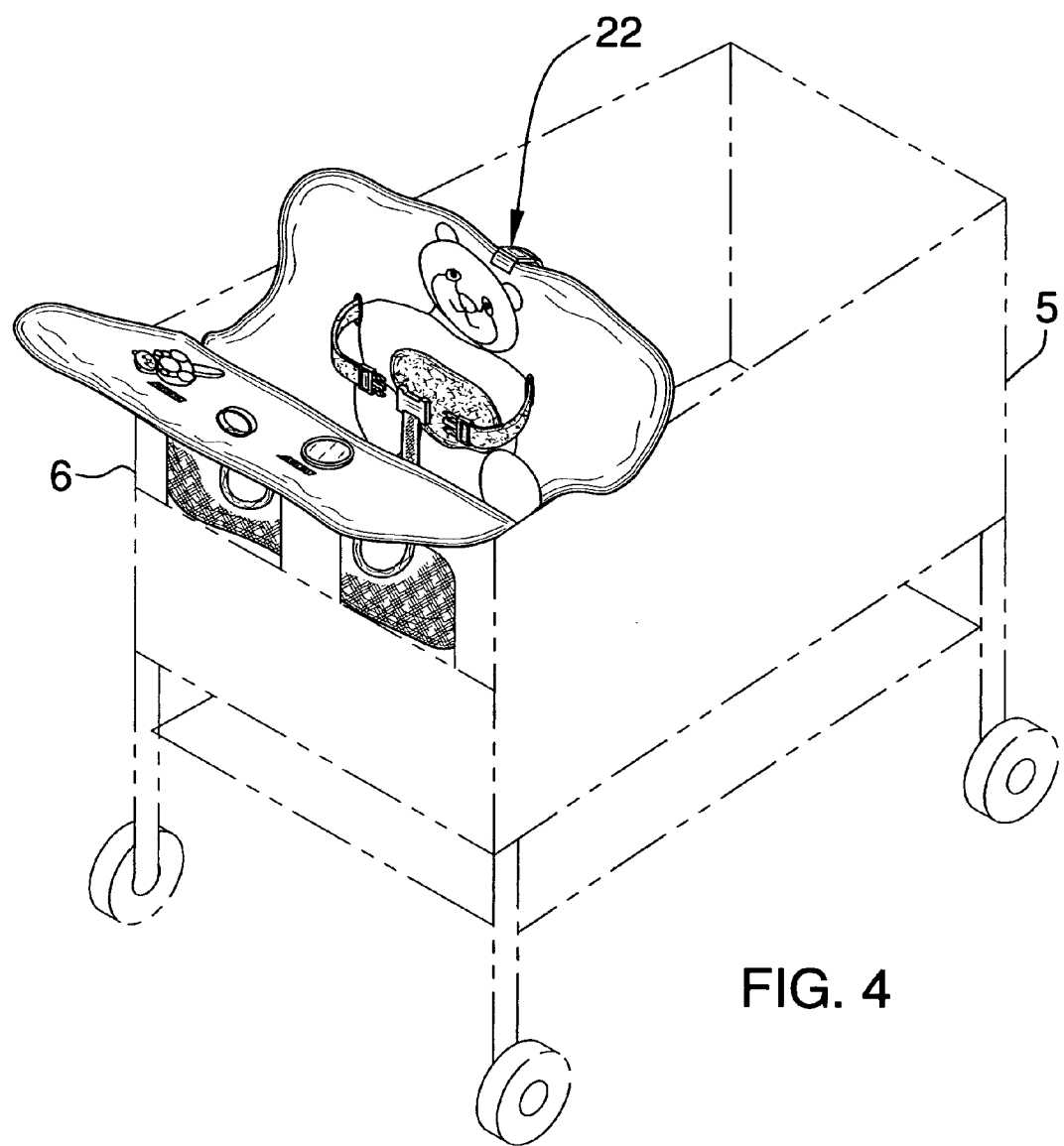
FIG. 4 is a perspective in-use view of the present invention.
Figure 5:
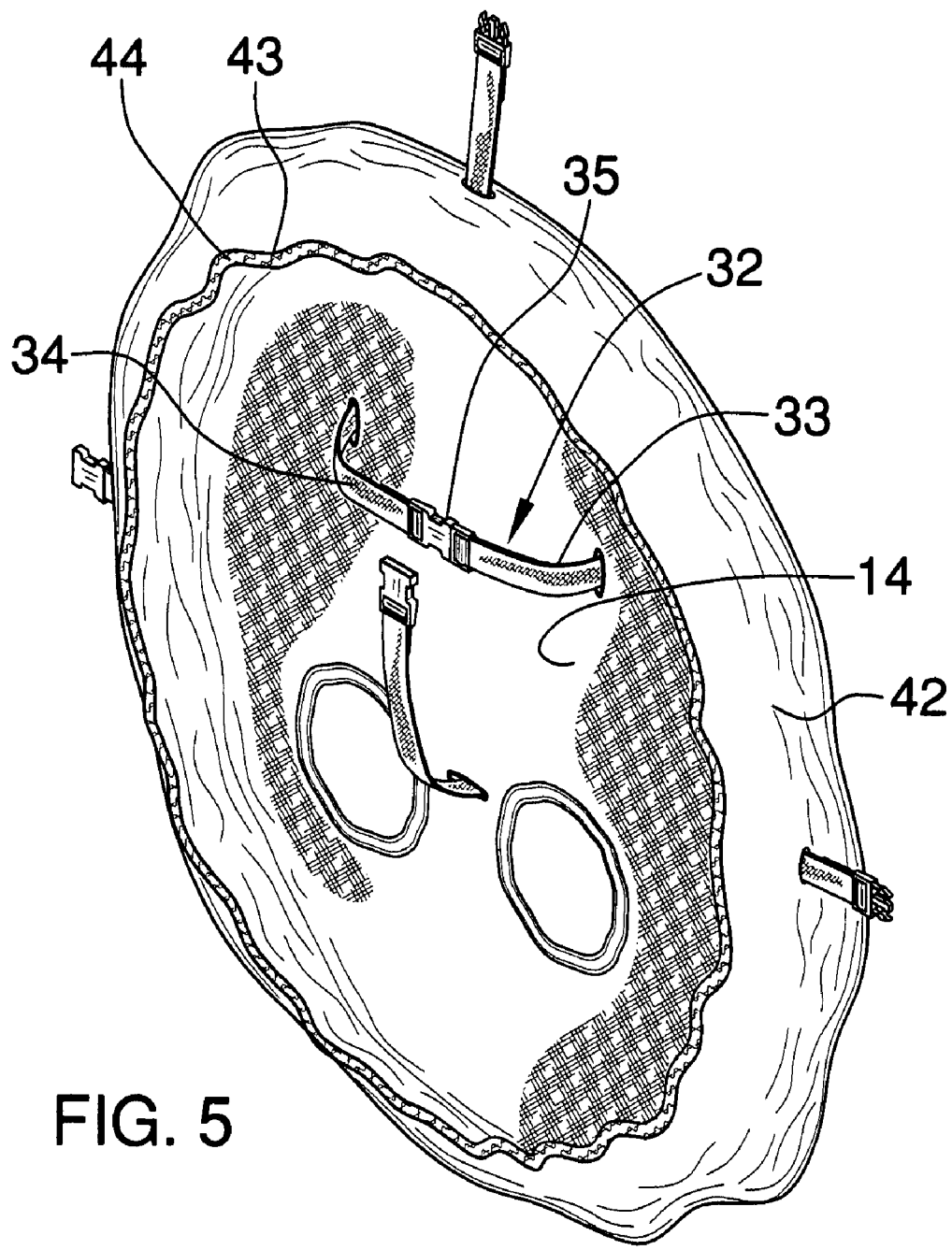
FIG. 5 is a rear perspective view of the present invention.
Figure 6:
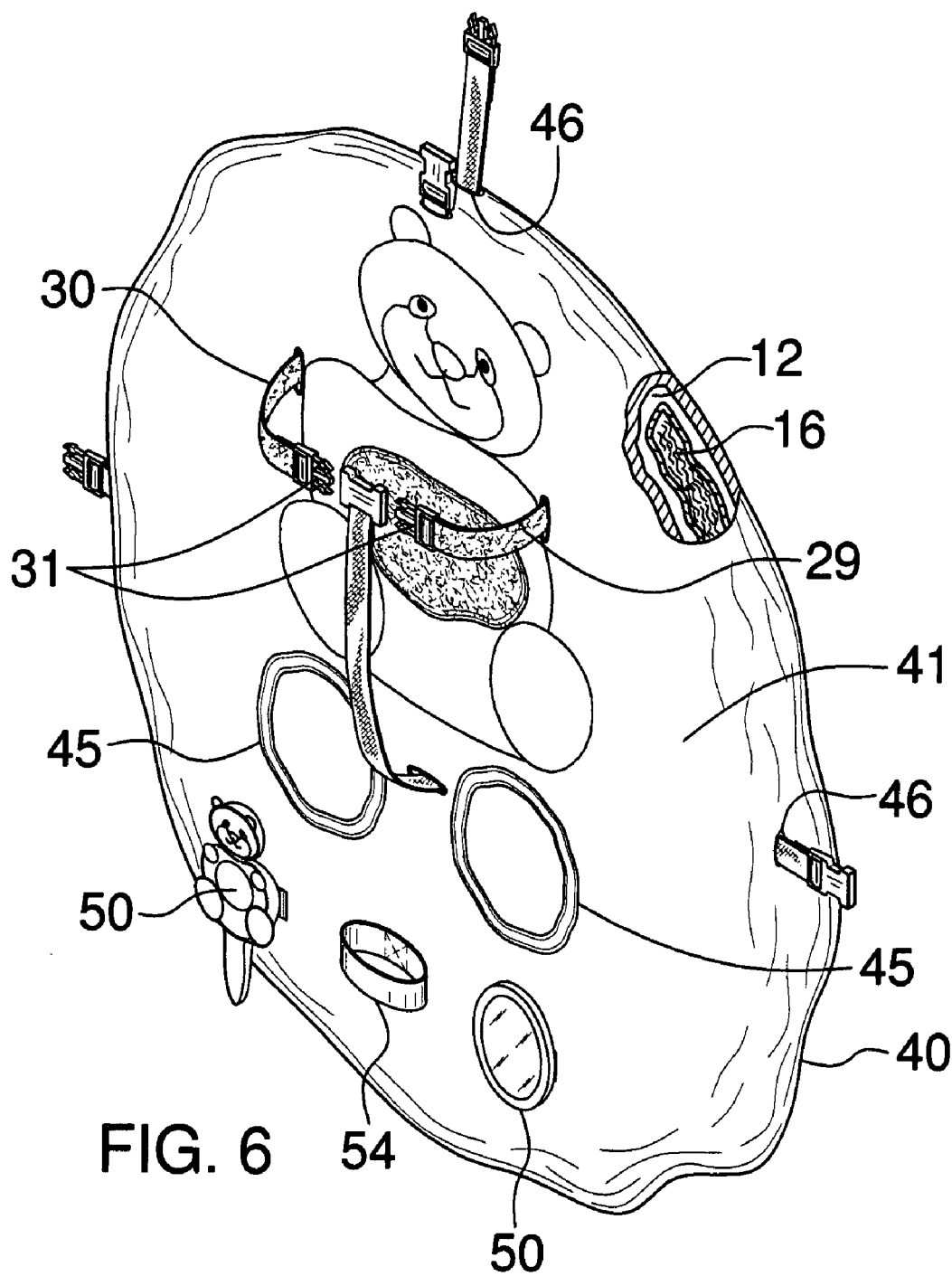
FIG. 6 is a front perspective view of the present invention.
Figure 7:
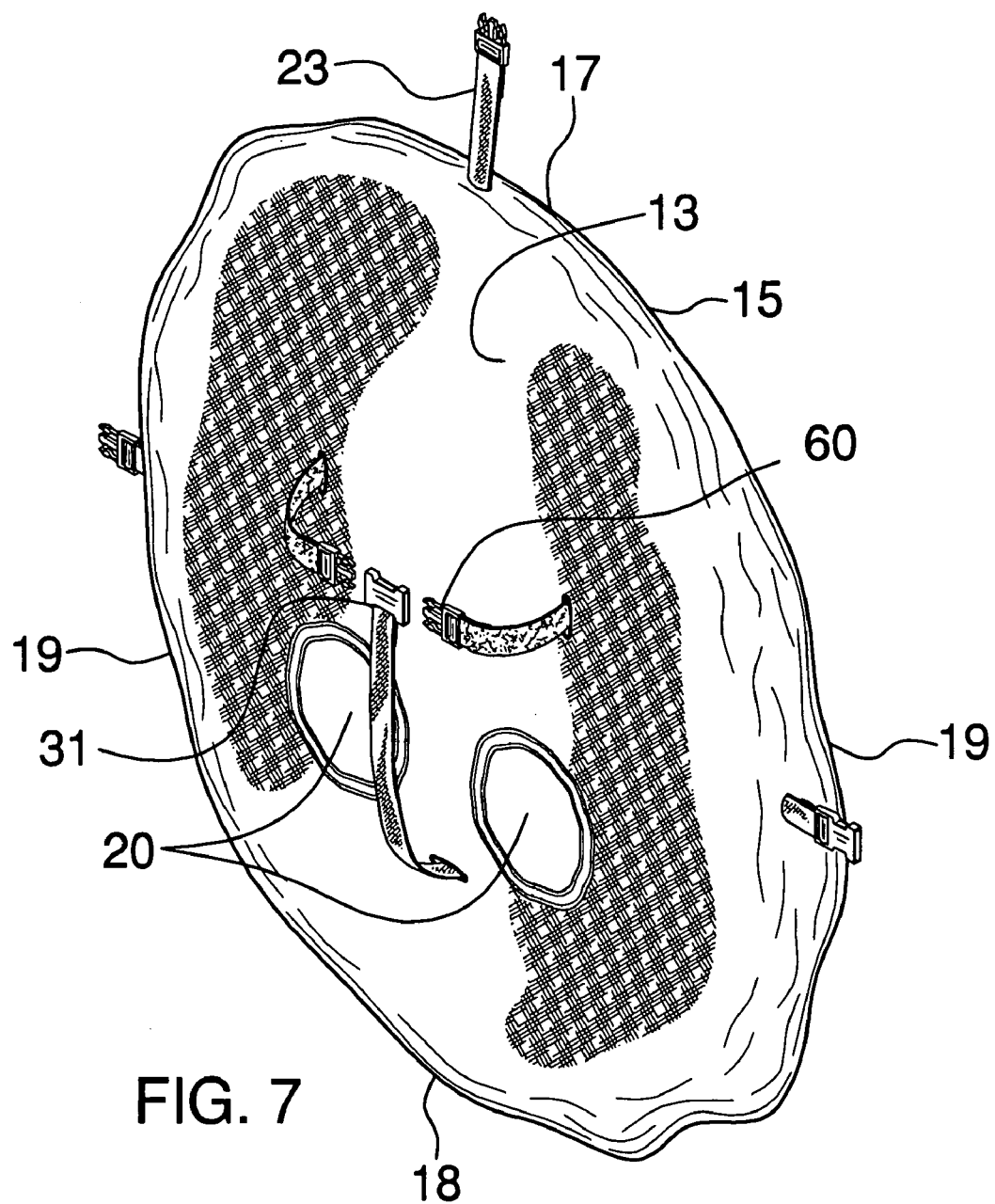
FIG. 7 is a front perspective view of the pillow of the present invention.

With reference now to the drawings, and in particular to FIGS. 1 through 7 thereof, a new cushion device embodying the principles and concepts of the present invention and generally designated by the reference numeral 10 will be described.

As best illustrated in FIGS. 1 through 7, the shopping cart seat cushion 10 generally comprises a pillow 12 that has a first side 13, a second side 14 and a peripheral edge 15 extending between the first 13 and second 14 sides. The pillow 12 is filled with a resiliently compressible material 16. The first 13 and second 14 sides are generally rounded so that the pillow 12 has an oblong shape. An upper edge 17, a lower edge 18 and a pair of lateral edges 19 of the pillow 12 are defined. The pillow 12 has a pair of openings 20 extending therethrough. The openings 20 are positioned nearer to the lower edge 18 than the upper edge 17. The openings 20 are horizontally aligned with each other.

A fastening assembly selectively couples the second side 14 of the pillow 12 to a child seat 6 of a shopping cart 5. The fastening assembly 22 includes a first strap 23 that is attached to and extends away from the upper edge 17 and a second strap 24 that is attached to and extends away from a central area of the second side 14. A coupler 25 is adapted for selectively coupling the first 23 and second 24 straps together. The coupler 25 is conventional and preferably includes a male engaging member and female engaging member.

A securing assembly selectively couples a child 7 to the first side 13 of the pillow 12. The securing assembly 28 includes a first tether 29 and a second tether 30 that is each attached to and extends away from the first side 13 of the pillow 12. The first 29 and second 30 tethers are horizontally aligned with each other and are positioned nearer the upper edge 17 than the lower edge 18. A fastener 31 is adapted for selectively fastening the first 29 and second 30 tethers together. Optionally, a third tether 60 may be attached to the pillow 12 between the openings 20. The fastener 31 in this instance would include a female coupler attached to an end of the third tether 60 and which adapted for receiving male couplers attached to the first 29 and second 60 tethers. If the third tether is not used, the fastener 31 would preferably include a male coupler attached to the first tether 29 and a female coupler attached to the second tether 30.

A secondary fastening assembly 32 selectively couples the second side 14 of the pillow 12 to the child seat 6. The secondary fastening assembly 32 includes a third strap 33 and a fourth strap 34. Each of the third 32 and fourth 33 straps is attached to and extends away from the second side 14 of the pillow 12. A secondary coupler 35 is adapted for selectively coupling the third 32 and fourth 34 straps together. The first 23 and second 24 straps are attached together and encircle the child seat 6 in such a way to prevent vertical movement of the pillow 12. The third 33 and fourth 34 straps are attached together to encircle the child seat to prevent lateral movement of the pillow 12.

A closing fastener includes male 36 and female 37 engaging members attached to the lateral sides 19 of the pillow 12.

The closing fastener 36, 37 allows the lateral edges 19 to be attached together for stored position to allow the seat cushion 10 to be used as a carrying bag. When attached together, the closing fastener 36, 37 folds up the pillow 12 and the third 32 and fourth 34 straps function as a handle for carrying the seat cushion 10.

A flexible covering 40 is removably positionable on the pillow 12. The covering 40 includes a front wall 41 and a perimeter wall 42 that is attached to and extends rearwardly away from the front wall 41. A perimeter edge 43 of the perimeter wall 42 defines a primary aperture in the covering 40 for selectively receiving the pillow. A resiliently stretchable band 44 is attached to and extends along the perimeter edge 43. The covering 40 has a pair of secondary apertures 45 therein. Each of the secondary apertures 45 is alignable with one of the openings 20. The covering 40 has a plurality of tertiary apertures therein 46. Each of the tertiary apertures 46 is positioned for selectively receiving each of the first 23 through fourth 34 straps and the first 29, second 30 and third 60 tethers, as well as the male 36 and female 37 engaging members of the closing fastener.

A plurality of toys 50 is provided. Each of a plurality of securing members is adapted for removably attaching each of the toys 50 to an outer surface of the front wall 41. Each of the securing members includes a hook and loop securing means that includes a first portion 51 and a second portion 52. Each of the first portions 51 is attached to one of the toys 50 and, each of the second portions 52 is attached to the front wall 41. The second portions 52 are positioned such that the second portions 52 are generally adjacent to the lower edge 18 when the covering 40 is positioned on the pillow 12 and the secondary apertures 45 are aligned with the openings 20.

A loop member 54 is attached to the front wall 41. The loop member 54 is positioned on the front wall 41 so that the loop member 54 is generally adjacent to the lower edge 18 when the covering 40 is positioned on the pillow 12. The loop member 54 comprises a resiliently elastic material.

In use, the cover 40 is placed on the pillow 12 and the pillow 12 is positioned in the child seat 6 of the shopping cart 5 so that each of the openings 20 is aligned with one of a pair of leg holes in the child seat 6. The pillow 12 is then fastened to the shopping cart 5 as described above. The child 7 is positioned on the pillow 12 and the child is secured to the pillow 12 with the securing assembly 32. Toys 50 may be secured to cover 40 and a bottle 55 may be attached to the cover 40 with the loop member 54. The toys 50 and bottle 55 keep the child 7 entertained.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cushion device for removably positioning in a shopping cart, said device comprising:
   a pillow having a first side, a second side and a peripheral edge extending between the first and second sides, said pillow being filled with a resiliently compressible material, said first and second sides being generally rounded, an upper edge, a lower edge and a pair of lateral edges of said pillow being defined, said pillow having a pair of openings extending therethrough, said openings being positioned nearer to said lower edge than said upper edge, said openings being horizontally aligned with each other;
   a fastening assembly for selectively coupling said second side of said pillow to a child seat of the shopping cart, said fastening assembly including a first strap being attached to and extending away from said upper edge and a second strap being attached to and extending away from a central area of said second side, a coupler being adapted for selectively coupling said first and second straps together;
   a securing assembly for selectively coupling a child to said first side of said pillow, said securing assembly including a first tether and a second tether each attached to and extending away from said first side of said pillow, said first and second tethers being horizontally aligned with each other and being positioned nearer said upper edge than said lower edge, a fastener being adapted for selectively fastening said first and second tethers together;
   a secondary fastening assembly for selectively coupling said second side of said pillow to the child seat, said secondary fastening assembly including a third strap and a fourth strap, each of said third and fourth straps being attached to and extending away from said second side of said pillow, a secondary coupler being adapted for selectively coupling said third and fourth straps together;
   a flexible covering being removably positioned on said pillow, said covering including a front wall and a perimeter wall being attached to and extending rearwardly away from said front wall, a perimeter edge of said perimeter wall defining a primary aperture in said covering for selectively receiving said pillow, a resiliently stretchable band being attached to and extending along said perimeter edge, said covering having a pair of secondary apertures therein, each of said secondary apertures being alignable with one of said openings, said covering having a plurality of tertiary apertures therein, each of said tertiary apertures being positioned for selectively receiving each of said first through fourth straps and said first and second tethers;
   a plurality of toys, each of a plurality of securing members being adapted for removably attaching each of said toys to an outer surface of said front wall, each of said securing members including a hook and loop securing means including a first portion and a second portion, each of said first portions being attached to one of said toys, each of said second portions being attached to said front wall and positioned such that said second portions are generally adjacent to said lower edge when said covering is positioned on said pillow; and
   a loop member being attached to said front wall, said loop member being positioned on said front wall such that said loop member is generally adjacent to said lower edge when said covering is positioned on said pillow, said loop member comprising a resiliently elastic material.

2. A method of using a cushion device in a shopping cart comprising the steps of:
   providing a pillow having a first side, a second side and a peripheral edge extending between the first and second sides, said pillow being filled with a resiliently compressible material, said first and second sides being generally rounded, an upper edge, a lower edge and a pair of lateral edges of said pillow being defined, said pillow having a pair or openings extending therethrough, said openings being positioned nearer to said lower edge than said upper edge, said openings being horizontally aligned with each other;

providing a fastening assembly for selectively coupling said second side of said pillow to a child seat of the shopping cart, said fastening assembly being attached to said pillow;

providing a securing assembly being attached to said pillow for selectively coupling a child to said first side of said pillow;

providing a flexible covering adapted for being removably positioned on said pillow, said covering including a front wall and a perimeter wall being attached to and extending rearwardly away from said front wall, a perimeter edge of said perimeter wall defining a primary aperture in said covering for selectively receiving said pillow, a resiliently stretchable band being attached to and extending along said perimeter edge, said covering having a pair of secondary apertures therein, each of said secondary apertures being alignable with one of said openings, said covering having a plurality of tertiary apertures therein, each of said tertiary apertures being positioned for selectively receiving each of said fastening and securing assemblies;

positioning said covering on said pillow such that said front wall abuts said first side of said pillow;

providing a loop member being attached to said front wall, said loop member being positioned on said front wall such that said loop member is generally adjacent to said lower edge when said covering is positioned on said pillow, said loop member comprising a resiliently elastic material;

positioning said pillow in a child seat of a shopping cart such that each of said openings is aligned with one of a pair of leg holes in the child seat;

fastening said pillow to the shopping cart with said fastening assembly;

positioning a child on said pillow;

securing the child to said pillow with said securing assembly; and securing a bottle to said covering with said loop member.

3. The method according to claim 2, further providing a plurality of toys, each of a plurality of securing members being adapted for removably attaching each of said toys to an outer surface of said front wall, each of said securing members including a hook and loop securing means including a first portion and a second portion, each of said first portions being attached to one of said toys, each of said second portions being attached to said front wall and positioned such that said second portions are generally adjacent to said lower edge when said covering is positioned on said pillow.

4. The method according to claim 2, further providing a secondary fastening assembly for selectively coupling said second side of said pillow to the child seat, said secondary fastening assembly including a third strap and a fourth strap, each of said third and fourth straps being attached to and extending away from said second side of said pillow, a secondary coupler being adapted for selectively coupling said third and fourth straps together.

5. The method according to claim 2, further providing a plurality of toys, each of a plurality of securing members being adapted for removably attaching each of said toys to an outer surface of said front wall.

* * * * *